United States Patent [19]

Kern

[11] Patent Number: 4,538,096
[45] Date of Patent: Aug. 27, 1985

[54] SPEED CONTROL CIRCUIT FOR A DC MOTOR

[75] Inventor: Hans Kern, Munich, Fed. Rep. of Germany

[73] Assignee: Siemens Aktiengesellschaft, Berlin & Munich, Fed. Rep. of Germany

[21] Appl. No.: 680,850

[22] Filed: Dec. 12, 1984

[30] Foreign Application Priority Data

Jan. 4, 1984 [DE] Fed. Rep. of Germany ....... 3400198

[51] Int. Cl.³ .......................... H02P 5/16; H02P 5/06
[52] U.S. Cl. ..................................... 318/314; 318/318; 318/313; 318/326; 318/327; 318/608
[58] Field of Search ............... 318/311, 312, 313, 314, 318/315, 317, 318, 319, 326, 327, 329, 341, 345 A, 599, 606, 607, 608, 616, 617, 615, 618, 619, 664

[56] References Cited

U.S. PATENT DOCUMENTS

| | | | |
|---|---|---|---|
| 3,562,615 | 2/1971 | Takuya Nasu et al. ............ | 318/314 |
| 4,197,489 | 4/1980 | Dunn et al. ...................... | 318/313 X |
| 4,278,925 | 7/1981 | Minakuchi ......................... | 318/314 |
| 4,307,324 | 12/1981 | Regnier ............................. | 318/314 |
| 4,370,677 | 1/1983 | Baldwin et al. .................. | 318/313 X |
| 4,380,723 | 4/1983 | Leis et al. ........................ | 318/314 |
| 4,386,300 | 5/1983 | Ogawa .............................. | 318/314 |
| 4,418,307 | 11/1983 | Hoffmann et al. ................ | 318/314 |
| 4,459,533 | 7/1984 | Ehret et al. ...................... | 318/314 X |
| 4,480,215 | 10/1984 | Bax .................................... | 318/318 X |

Primary Examiner—William M. Shoop, Jr.
Assistant Examiner—Shik Luen Paul Ip
Attorney, Agent, or Firm—Hill, Van Santen, Steadman & Simpson

[57] ABSTRACT

A speed control circuit for a DC motor has a phase comparator to which is supplied a theoretical frequency, emitted by a clock pulse generator, and an actual frequency, emitted from a pulse transmitter connected to the drive shaft of the motor. A first rotation direction signal, obtained from a rotation direction indicator, and a second rotation direction signal, obtained from the comparator, are combined in a logic element, the output of which is supplied to a drive circuit for driving the DC motor. A reference voltage is also supplied to the drive circuit, the reference voltage being obtained from another output of the comparator and supplied to the drive circuit through a filter. The reference voltage is a DC voltage which is proportional to the amount of phase deviation detected by the comparator. This reference voltage is utilized by the drive circuit to set the proportional value of the current supplied to the DC motor.

5 Claims, 3 Drawing Figures

SPEED CONTROL CIRCUIT FOR A DC MOTOR

BACKGROUND OF THE INVENTION

1. Field of the Invention

The present invention relates to a speed control circuit for a DC motor, and in particular to a speed control circuit for a DC motor utilized to operate movable elements in a communications terminal.

2. Description of the Prior Art

The use of DC motors for drive purposes in terminals in communications technology is known in the art. Such motors may be used, for example, to position platens, printer carriages, and type wheels.

A speed control circuit for a DC motor is described in the text "Theory and Applications Of Phase Locked Loops," Best, Second Edition, page 93. In this circuit, the DC motor, in combinaton with a pulse transmitter and a voltage controlled regulator for the motor current, functions essentially as a voltage controlled oscillator. One side of the DC motor is connected to ground. This conventional circuit has the disadvantage that because deceleration is produced only by friction and the electromotive force, speed fluctuations, in particular fluctuations occurring at low speeds, can only be slowly adjusted.

SUMMARY OF THE INVENTION

It is an object of the present invention to provide a speed control circuit for a DC motor which effects rapid speed control even at low speeds, and also in instances of substantial load changes.

The above object is inventively achieved in a speed control circuit for a DC motor having a phase comparator having a first input to which a theoretical frequency, obtained from a clock pulse generator, is supplied, and having a second input to which an actual frequency, obtained from a pulse transmitter connected to the drive shaft of the motor, is supplied. The circuit also includes a rotation direction indicator, which generates a first rotation direction signal. The phase comparator generates a second rotation direction signal at one output thereof, the first and second rotation direction signals being supplied to a logic element. A reference voltage is generated at another output of the phase comparator, which is supplied to a filter. The respective outputs of the logic element and the filter are supplied to a drive circuit connected to the motor. The reference voltage, which is a DC voltage proportional to the amount of phase deviation, is utilized in the drive circuit to set the proportional value of the current flowing through the DC motor.

The speed control circuit disclosed and claimed herein permits selection of the rotation direction of the DC motor to be undertaken in a simple manner. Moreover, this circuit can be substantially entirely constructed in integrated circuit technology, thus lending to simplified construction.

DESCRIPTION OF THE PREFERRED EMBODIMENTS

Figure 1:
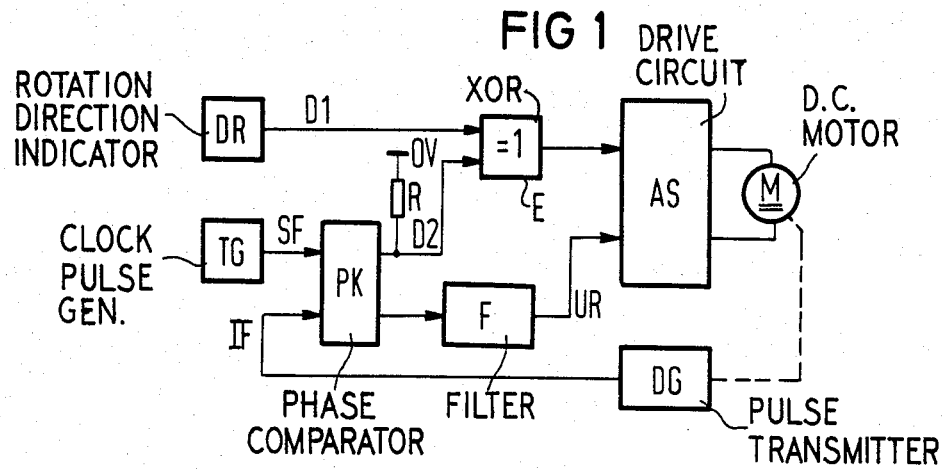
FIG. 1 is a block circuit diagram of a speed control circuit constructed in accordance with the principals of the present invention.

A speed control circuit constructed in accordance with the principals of the present invention is shown in FIG. 1, which includes a rotation direction indicator DR, a clock pulse generator TG, a phase comparator PK, a filter F, an exclusive OR (XOR) logic element E, a drive circuit AS connected for operating a DC motor M, and a pulse transmitter DG. The DC motor M is supplied with current by the drive circuit AS. In a known manner, the pulse transmitter generates a signal which is proportional to the speed of the DC motor M. The output of the pulse transmitter DG is supplied to a first input of the phase comparator PK as an actual frequency signal IF. The pulse transmitter DG may, for example, be a segmented disc attached to the rotor or drive shaft of the DC motor M. The segments at the periphery of the disc are scanned by a fixed optical sensor, thus generating a rectangular alternating voltage as the output signal.

The phase comparator PK is additionally supplied at a second input with a theoretical frequency SF obtained from the clock pulse generator TG. The rotation direction indicator DR generates a first rotation direction signal D1, which is supplied to one input of the logic element E. A second rotation direction signal D2 is supplied to the other input of the logic element E. The output of the phase comparator PK at which the second rotation direction signal D2 is generated is also connected to a reference potential 0V through a so-called pull-down resistor R.

Another output of the phase comparator PK is supplied to a filter F. The output of the filter F is supplied to the drive circuit AS as a reference voltage UR. The output of the logic element E is supplied to another input of the drive circuit AS.

The phase comparator PK may, for example, be a commercially available module MC 14568 B. The theoretical frequency SF supplied by the clock pulse generator TG is then connected to terminal 14 of this module, the actual frequency IF supplied by the pulse generator DG is supplied to terminal 9, the input of the filter F is connected to terminal 12, and the one input of the logic element E is connected to terminal 13. The remainder of connections for the phase comparator PK can be obtained from the specification sheets as needed.

The drive circuit AS may, for example, be a commercially available moduel PBL 3717. The reference voltage UR from the filter F will then be connected to terminal 11 of this module, the output of the logic element E is connected to terminal 8, and the DC motor M is connected to terminals 1 and 15. Again, the remainder of connections for this module can be obtained from the specification sheets.

Figure 2:
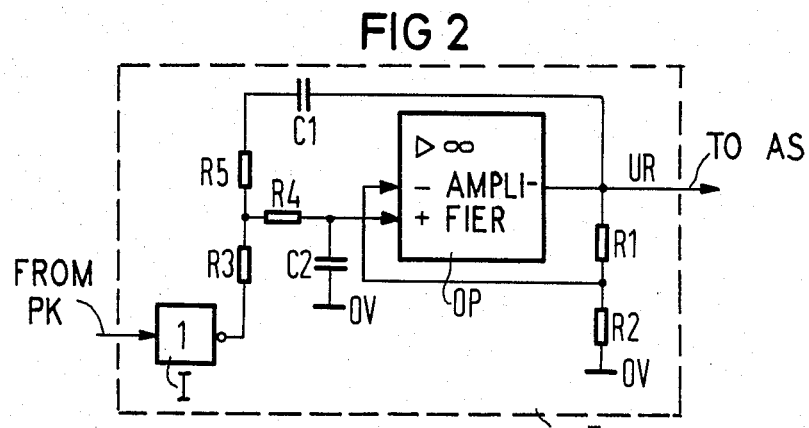
FIG. 2 is a detailed circuit diagram for the filter shown in the block diagram of FIG. 1.

Details of a filter F suitable for use in the circuit shown in FIG. 1 or shown FIG. 2. In this embodiment, the filter F consists of an operational amplifier OP having an output connected to the reference potential 0V through a voltage divider network consisting of resistors R1 and R2, and to its non-inverting input through another network consisting of a capacitor C1 and resistors R5 and R4. The output signal from the phase comparator PK is connected to the non-inverting input of the operational amplifier OP through an inverter I, a resistor R3, and the resistor R4. The non-inverting input of the amplifier OP is also connected to reference potential 0V through a capacitor C2, and the inverting input is connected to a tap between the resistors R1 and R2.

The filter F thus contains a combination of an integrator with a time constant $(R3+R5)\times C1$, and a matching amplifier. The amplifier functions to amplify the maximum value of the reference voltage UR to the maximum value which is to be supplied to the associated input of the drive circuit AS. This value is governed by the maximum value of the current which can be set to flow through the DC motor M, and can be obtained from the data sheets for the motor M.

Figure 3:
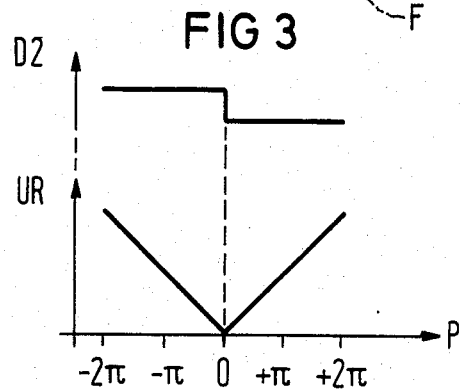
FIG. 3 is a graphical representation of the operation of the speed control circuit shown in FIG. 1.

A graphical representation of the dependence of the second rotation direction signal D2 and the reference voltage UR upon a phase difference P measured by the comparator PK is shown in FIG. 3. The phase difference P has a value of 0 when the theoretical frequency SF emitted by the clock pulse generator TG and the actual frequency IF emitted by the pulse transmitter DG have the same phase. It is possible for these two phases to shift in the negative direction by the value $2\pi$, and in the positive direction theoretically by multiples of $2\pi$. A range from $-2\pi$ to $+2\pi$ is shown in FIG. 3 which occurs in practice. In the case of a negative phase difference P, the binary second rotation direction signal D2 has a level corresponding to logic 1, and in the case of a positive phase difference P has a level corresponding to a logic 0.

The reference voltage UR exhibits a rise or gradient in both the cases of a positive or a negative phase difference P, the absolute values of the gradients being equal.

Operation of the circuit shown in FIG. 1 is as follows:

The rotation direction of the DC motor M can be selected by means of the binary first rotation direction signal D1 emitted by the rotation direction indicator DR. In a known manner, the phase comparator PK compares the phase position of the two input signals, the theoretical frequency SF and the actual frequency IF. The comparator emits a binary second rotation direction signal D2 (see FIG. 3), that is, a TTL no type signal corresponding to the direction of the phase deviation. This signal is supplied through the XOR logic element E to the drive circuit AS and causes the DC motor M to accelerate or decelerate relative to the selected rotation direction. The reference voltage UR is supplied by the phase comparator PK to the drive circuit AS through the filter F. The reference voltage UR is a DC voltage which is proportional to the amount of the phase deviation. By means of the drive circuit AS, this DC voltage serves to set the proportional value of the current flowing through the DC motor M.

Any module which permits selection of the rotation direction of the connected DC motor M, and which can set the value of the current flowing through the DC motor M is suitable for use as the drive circuit AS. In addition to the commercially available module identified above, the drive circuit AS may be realized, for example, by module BPL 3770.

Any module which emits output signals which are dependent upon the amount of the phase position and the sign of the phase difference between the input signals can be used as the phase comparator PK.

Although modifications and changes may be suggested by those skilled in the art, it is the intention of the inventor to embody within the patent warranted hereon all changes and modifications as reasonably and properly come within the scope of his contribution to the art.

I claim as my invention:

1. A speed control circuit for a DC motor comprising:
    a drive circuit connected to said motor for supplying current thereto, said drive circuit having first and second control inputs;
    a means connected to said motor for generating an actual rotation frequency signal;
    a means for generating a theoretical frequency signal;
    a comparator having respective inputs to which said actual frequency signal and said theoretical frequency signal are supplied, said comparator generating a second rotation direction signal at a first output connected to said first contol input and generating a reference voltage proportional to the amount of phase difference between said theoretical frequency signal and said actual frequency signal at a second output of said comparator; and
    a filter having an input connected to said second output of said phase comparator, and having an output connected to said second control input of said drive circuit for controlling said drive circuit in response to said reference voltage.

2. A speed control circuit as claimed in claim 1, and further comprising:
    a means for generating a first rotation direction signal; and
    an exclusive or logic element having respective inputs connected to the output of said means for generating a first rotation direction signal and to said first output of said phase comparator, and having an output connected to said first control input of said drive circuit for controlling said drive circuit in combination with said reference voltage.

3. A speed control circuit as claimed in claim 2 wherein said first output of said phase comparator is connected to ground through a pull-down resistor.

4. A speed control circuit as claimed in claim 1 wherein said filter is a combinaton integrator and a matching amplifier.

5. A speed control circuit as claimed in claim 1 wherein said filter comprises:
    an operational amplifier having an output and an inverting input and a non-inverting input;
    a voltage divider network interconnected between said output of said operational amplifier and ground;
    an RC network connected between said output of said operational amplifier and said non-inverting network of said operational amplifier;
    said inverting input of said operational amplifier being connected to a tap of said voltage divider network; and
    an inverter interconnected between said second output of said phase comparator and a tap of said RC network.

\* \* \* \* \*